(12) United States Patent
Hu et al.

(10) Patent No.: US 8,379,785 B2
(45) Date of Patent: Feb. 19, 2013

(54) SYSTEMS AND METHODS FOR PERFORMING DYNAMIC CHANNEL ESTIMATION

(75) Inventors: Junquiang Hu, Davis, CA (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 37 days.

(21) Appl. No.: 12/911,455

(22) Filed: Oct. 25, 2010

(65) Prior Publication Data

US 2012/0099637 A1 Apr. 26, 2012

(51) Int. Cl.
*H04L 7/00* (2006.01)
*H04B 1/10* (2006.01)
*H04N 5/00* (2006.01)

(52) U.S. Cl. .................. 375/367; 375/350; 348/607

(58) Field of Classification Search .................. 375/350, 375/367; 348/607
See application file for complete search history.

(56) References Cited

U.S. PATENT DOCUMENTS

| | | | | |
|---|---|---|---|---|
| 5,748,686 | A * | 5/1998 | Langberg et al. | 375/367 |
| 5,828,954 | A * | 10/1998 | Wang | 455/260 |
| 2004/0125235 | A1* | 7/2004 | Kim et al. | 348/607 |
| 2007/0110200 | A1* | 5/2007 | Mergen et al. | 375/350 |
| 2007/0153888 | A1* | 7/2007 | Kim et al. | 375/229 |
| 2009/0304065 | A1* | 12/2009 | Choi et al. | 375/232 |

OTHER PUBLICATIONS

B. Agee. The least-squares cma: A new technique for rapid correction of constant modulus signals. In Proc. IEEE International Conference on ICASSP 1986. Acoustics, Speech, and Signal Processing, vol. 11, pp. 953-956, Apr. 1986.

Yuxin Chen, T. Le-Ngoc, B. Champagne, and Changjiang Xu. Recursive least squares constant modulus algorithm for blind adaptive array. IEEE Trans. Signal Process., 52(5):1452-1456, May 2004.

Zhi Ding and Ge Li. Single-channel blind equalization for gsm cellular systems. IEEE J. Sel. Areas Commun., 16(8):1493-1505, Oct. 1998.

D. N. Godard. Self-recovering equalization carrier tracking in two dimensional data communications systems. IEEE Trans. Commun., 28:1867-1875, Nov. 1980.

Ye Li and Zhi Ding. Global convergence of fractionally spaced godard (cma) adaptive equalizers. IEEE Trans. Signal Process., 44(4):818-826, Apr. 1996.

R. Pickholtz and K. Elbarbary. The recursive constant modulus algorithm; a new approach for real-time array processing. In Conference Record of the Twenty-Seventh Asilomar Conference on Signals, Systems and Computers, pp. 627-632, Nov. 1-3, 1993.

P. A. Regalia. A finite-interval constant modulus algorithm. In Proc. IEEE International Conference on Acoustics, Speech, and Signal Processing (ICASSP 2002), vol. 3, pp. III2285-III2288, May 13-17, 2002.

(Continued)

*Primary Examiner* — David C. Payne
*Assistant Examiner* — Sarah Hassan
(74) *Attorney, Agent, or Firm* — Joseph Kolodka; Bao Tran

(57) ABSTRACT

Systems and methods are disclosed for dynamic channel estimation in a digital receiver by performing a dynamic equalization on an incoming signal to compensate for channel distortion; independently estimating one or more channel parameters for the dynamic equalization, wherein the one or more channel parameters track channel change; determining a convolution of the channel parameters and updating the parameters for the dynamic equalization for subsequent processing of incoming signal; and providing an equalized output from the digital receiver.

16 Claims, 6 Drawing Sheets

OTHER PUBLICATIONS

O. Shalvi and E. Weinstein. New criteria for blind deconvolution of nonminimum phase systems (channels). IEEE Trans. Inf. Theory, 36(2):312-321, 1990.

J. Treichler and B. Agee. A new approach to multipath correction of constant modulus signals. IEEE Trans. Acoust., Speech, Signal Process., 31(2):459-472, Apr. 1983.

J.K. Tugnait, O. Shalvi, and E. Weinstein. Comments on new criteria for blind deconvolution of nonminimum phase systems (channels). IEEE Trans. Inf. Theory, 38(1):210-213, 1992.

V. Zarzoso and P. Comon. Optimal step-size constant modulus algorithm. IEEE Trans. Commun., 56(1):10-13, Jan. 2008.

* cited by examiner

SYSTEMS AND METHODS FOR PERFORMING DYNAMIC CHANNEL ESTIMATION

BACKGROUND

The present invention is related to a communication system with digital receiver channel equalization.

In a digital receiver, dynamic equalization is usually needed to compensate for time-variant channel distortion and eliminate inter-symbol-interference (ISI). FIG. 1 gives the typical DSP (digital signal processing) elements and procedure. Signal x is input to receiver system 100 and is first fed to pre-processing block 102 which, for example, can be perform sampling rate conversion and fixed channel-effect compensation/pre-equalization, among others. Signal y from block 102's output is coupled to dynamic channel equalization 104 which usually uses FIR (Finite Impulse Response) filter. In combination, blocks 102 and 104 form block 110 that performs digital receiver channel equalization.

Block 104's input and output signals (y and z) are also connected to channel estimation block 106 to track for channel changes and update channel parameters for block 104. Such parameters can be FIR filter coefficients, in case FIR filter is applied in channel equalization block 104. Channel equalization block 104 then takes the updated parameters to equalize its next input signal. Signal output from 104 is passed to post-processing block 108.

However, in some cases due to combined processing, for example pre-processing 102 and channel equalization 104 are merged to processing block 110, such input signal to channel estimation block 106 will not be available. One example is when dynamic equalization combined with pre-processing in frequency-domain where FFT (Fast Fourier Transform) is applied to the input signal, while channel estimation is still performed in time domain. In such case there must be alternative ways to re-generate the expected input signal.

Conventional systems may re-generate the expected input by applying de-convolution to the output signal z. Convolution is the DSP operation for two functions f(n) and g(n), producing a third function defined as:

$$(f * g)[n] \stackrel{def}{=} \sum_{m=-\infty}^{\infty} f[m]g[n-m]$$

For example, f can be input signal, and g can be a FIR filter function. De-convolution can be done using a reverse of estimated channel parameter (i.e., reverse of FIR filter) to do convolution with signal output, which is:

$$(f(n)*g(n))*g^{-1}(n)=f(n)$$

However, it can be difficult to get the reverse of channel parameters for the above solution. The added complexity in calculating de-convolution may require more powerful hardware which is power hunger. Further, additional errors may be caused when simplifying assumptions or engineering approximations are used.

SUMMARY

Systems and methods are disclosed for dynamic channel estimation in a digital receiver by performing a dynamic equalization on an incoming signal to compensate for channel distortion; independently estimating one or more channel parameters for the dynamic equalization, wherein the one or more channel parameters track channel change; determining a convolution of the channel parameters and updating the parameters for the dynamic equalization for subsequent processing of incoming signal; and providing an equalized output from the digital receiver.

Implementations of the above aspect may include one or more of the following. The channel parameters can be converted to a rate or a format that matches the dynamic equalization rate or format. The system includes performing sub-level channel estimation. The sub-level channel estimation can use an open loop with the incoming signal. The sub-level equalization uses the dynamic equalization. The channel estimation uses a portion of output signals from the dynamic equalization. The parameter updating comprises combining a pre-existing parameter with newly estimated channel parameters. The combining includes applying a convolution to the pre-existing and new parameters. The convolution outputs can be kept to a predetermined length using truncation such as dropping zero outputs in the truncation. The dynamic equalization and the channel estimation can be done using separate paths. Rate conversion can be applied to the dynamic equalization prior to estimating the channels. The rate conversion can be applied to updated channel parameters prior to the dynamic equalization. The rate conversion can be applied to newly estimated parameters prior to combining with pre-existing parameters. The dynamic equalization is in a frequency domain and the estimating of channel parameters are in a time domain. The conversion of newly estimated parameters to frequency domain can be done prior to combining with pre-existing parameters. The newly estimated parameters and pre-existing parameters can be combined by one-by-one multiplication. The newly estimated parameters can be combined with pre-existing parameters and the combined parameters can be converted to a frequency domain. The dynamic equalization and the estimating of channel parameters can be all done in a frequency domain. One implementation takes dynamic channel equalization block output z as input and applies dynamic equalization solutions such as Constant Modulus Algorithm (CMA) to estimate channel parameters, where channel means all the paths from transmitter output to signal z. The estimated parameters are further processed using convolution with those used in achieving signal z, to have updated parameters as those applied to the dynamic channel equalization block.

Advantages of the preferred embodiments may include one or more of the following. The system reduces processing complexity which further results in lower cost. The system can provide a solution without knowing the input for the channel estimation block. By treating the signal path from transmitter output all the way to dynamic equalizer's output as an extended channel, the system can apply channel estimation to this "extended channel" output, which is actually the equalized signal, and uses the estimated channel parameter to update the old one that result in the current output signals.

DESCRIPTION

Figure 1:
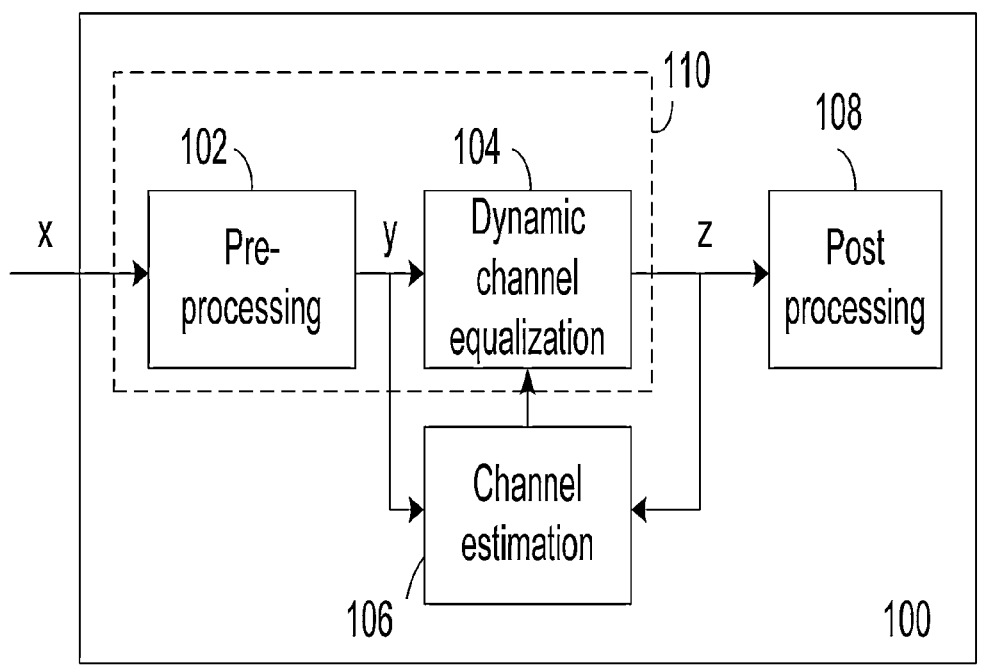
FIG. 1 gives the typical DSP (digital signal processing) receiver system.
Figure 2:
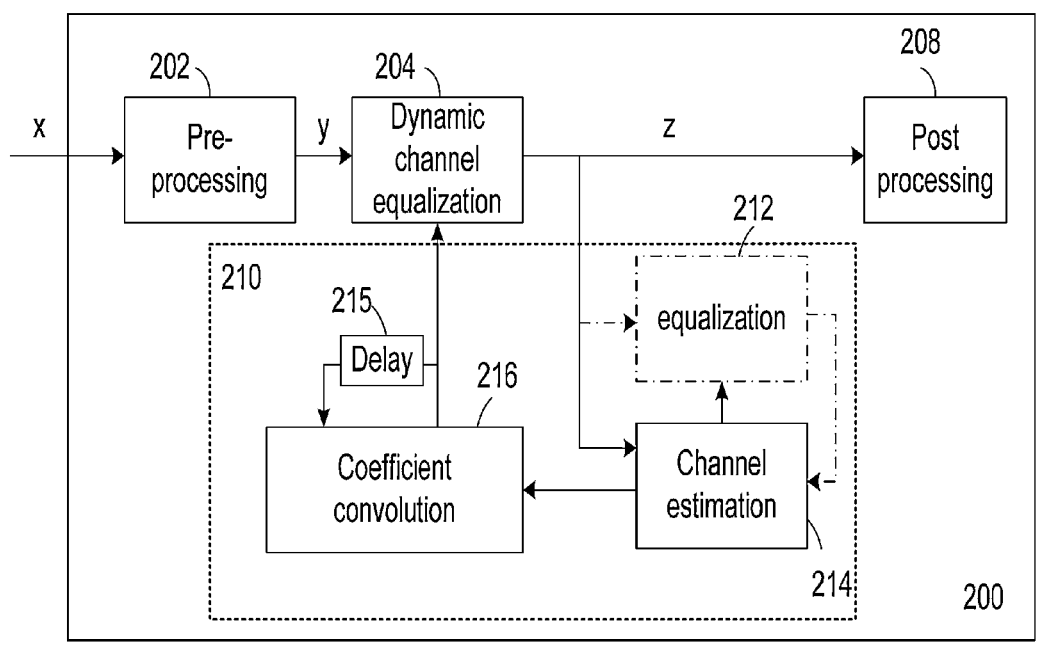
FIG. 2 shows a block diagram of one embodiment of the present invention.

FIG. 2 shows a block diagram of one embodiment of the present invention. Input signal x is first processed by pre-processing block 202, which is further coupled to channel equalization block 204. In one embodiment, channel equalization block 204 is a FIR filter which takes coefficients from extended channel estimation block 210. Block 210's extended channel estimation operation is done by sub-level channel estimation block 214 and FIR coefficient convolution block 216 with a delay block 215. Sub-level equalization block 212 may also be included if closed-loop channel estimation algorithm is applied.

Turning now to sub-level channel estimation block 214, various blind equalization processes can be used, such as CMA (Constant Modulus Algorithm), SWA (Shalvi-Weinstein), training-based processes such as LMS (Least Mean Square), or other suitable techniques can be used. In one embodiment, sub-level channel estimation block 214 can be open-loop processing only, which means it only takes input to calculate the channel parameters (based on signal z). In another embodiment, there is also a sub-level equalization block 212, whose output is fed into 214 for error calculation and channel parameters update, so that 212 and 214 make a closed-loop for parameter update.

As to sub-level equalization block 212, in one embodiment, sub-level equalization block 212 has substantially identical architecture/algorithm as that in dynamic channel equalization block 204. In another embodiment, dynamic channel equalization block 204 processes in frequency domain which is equivalent to that of time-domain processing in sub-level equalization block 212. In a further embodiment, the processing of 204 and 212 may be different, in case there is fixed mapping relationship which can be reflected from parameter conversion done in coefficient convolution block 216. Sub-level equalization block 212 and sub-level channel estimation block 214 may only process a portion of signals from 204's output (signal z).

Referring to coefficient convolution block 216, block 216 combines the updated parameters from 214 with those used in dynamic channel equalization block 204 to generate new parameters for block 204. For example, if block 204 and block 212 are both FIR filters, direct convolution operation to the two parameter groups may be applied to generate updated parameters. In implementation complexity, the coefficient length is expected to be constant; however the convolution processing usually results in longer output. So convolution results should be truncated to the expected number.

In one embodiment, the sampling rate used in block 204 and block 212 may be different. In that case signal output from block 204 might be resampled before feeding into block 212 and block 214; also the parameters output from block 214 may be resampled before running convolution with those used in block 204. Parameters resampling may also be done after convolution block 216, before feeding into block 204.

By treating the signal path from transmitter output all the way to dynamic equalizer's output as an extended channel, the system of FIG. 2 can apply channel estimation to this "extended channel" output, which is actually the equalized signal, and uses the estimated channel parameter to update the old one that result in the current output signals.

Figure 3:
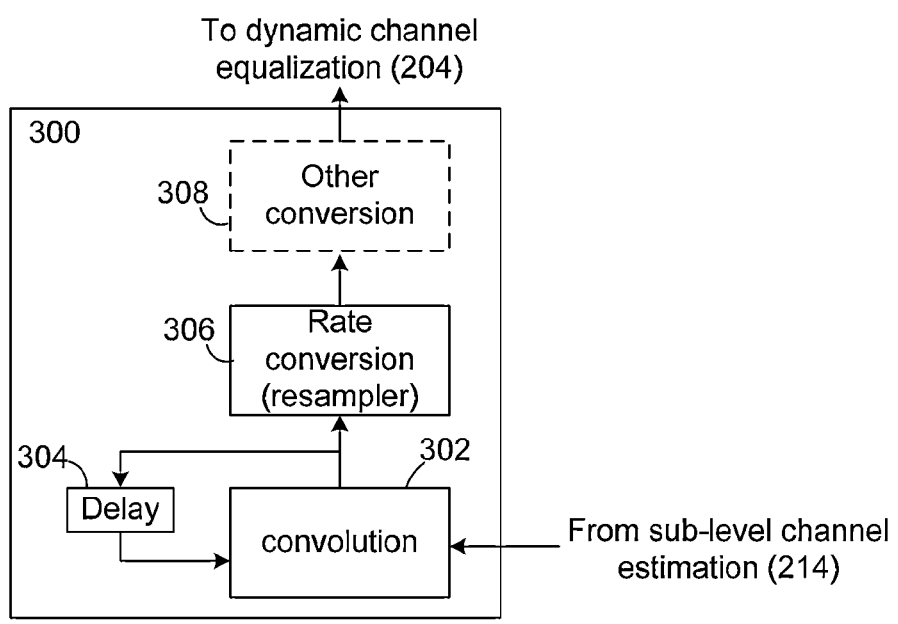
FIG. 3 shows an exemplary illustration of rate conversion when placed after the actual convolution block.

One example is given in FIG. 3, where block 300 shows the updated parameters processing path. Following actual convolution block 302, a rate conversion matches the difference between sub-level channel estimation block 214 and dynamic channel estimation block 204.

Figure 4:
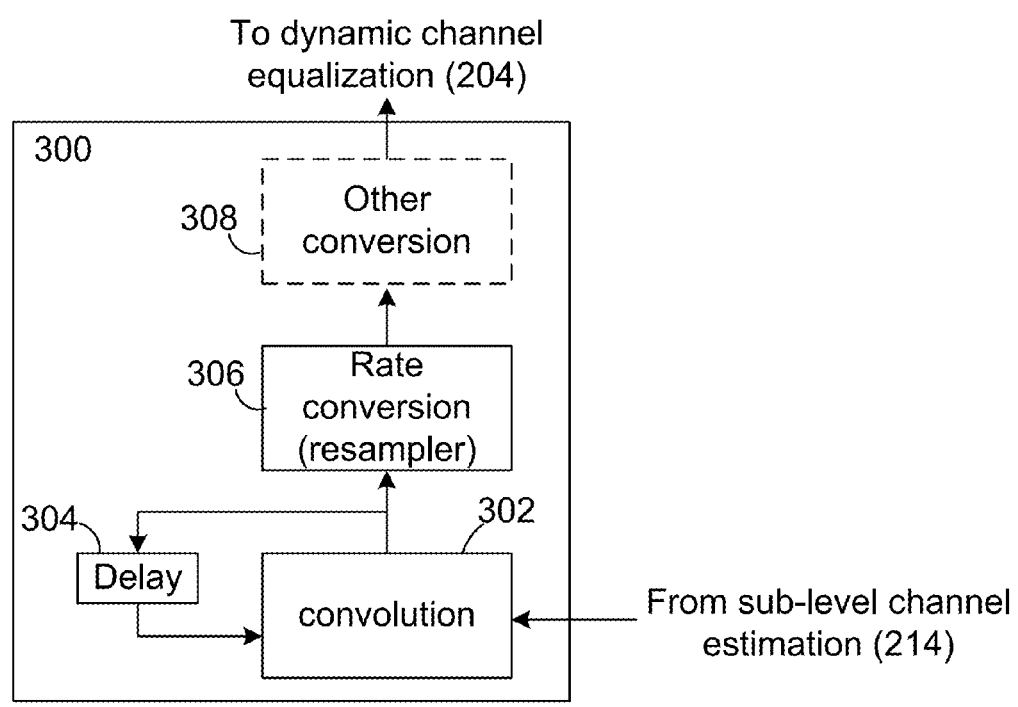
FIG. 4 shows an exemplary illustration of rate conversion when placed after the actual before actual convolution block.

In an alternative embodiment shown in FIG. 4, the rate conversion is placed right at input from sub-level channel estimation block 214. "Delay" block 304 saves the previous parameters for combining with new input.

In FIG. 3 and FIG. 4, block 308 represents "other conversion", which for example, can be time-domain to frequency-domain conversion. In one embodiment, if dynamic channel equalization 204 processes in frequency domain and the result parameter from block 214 is in time domain, then coefficient convolution outputs need to be converted to frequency domain before feeding into block 204. If the output from 204 is still in frequency domain while 214 takes time-domain input signals only, then corresponding frequency-to-time domain signal conversion is also needed for 214 and 212's input. Similarly, if both the processing in 204 and the results from 214 are in frequency domain, then the operation in 216 can be direct multiplication of old coefficients and 214's output coefficients. Again rate conversion will be needed if there is mismatch between 214's output and those used by dynamic channel estimation block 204.

Referring now to convolution and truncation, this process uses FIR filter for dynamic channel equalization block 204 as an example, though it is also be applicable to other cases. As mentioned above, if block 216 performs a time-domain convolution, the non-zero results will be more than those needed in block 204. The system would need to truncate the number of resulting taps, which picks some of the non-zero results while drop the others. It is achieved by using unit vector I (the convolution of I and any function g(n) is still g(n−k), where k is determined by I) as old parameters, to drop the always-zero outputs no matter what the input is. For example, in case of a 13-tap FIR filter in blocks 204 and 214, when $$I(n) = \begin{cases} 1, & n = 6 \\ 0, & n = 0 \text{ to } 12 \text{ and } n \neq 6, \end{cases}$$

the truncated convolution can be:

$$y(n) = \sum_{i=0}^{12} h(n).$$

x(n+i−12), n=0 to 12, n=0 to 12, where y(n) is truncated convolution output, h(n) as old coefficients and x(n) as new input, or vice versa.

In case initially the channel parameter is unknown, in one embodiment, the coefficient to be applied to dynamic channel equalizer 204 is set to unit vector I, which is used when deciding which convolution results are to be dropped.

Figure 5:
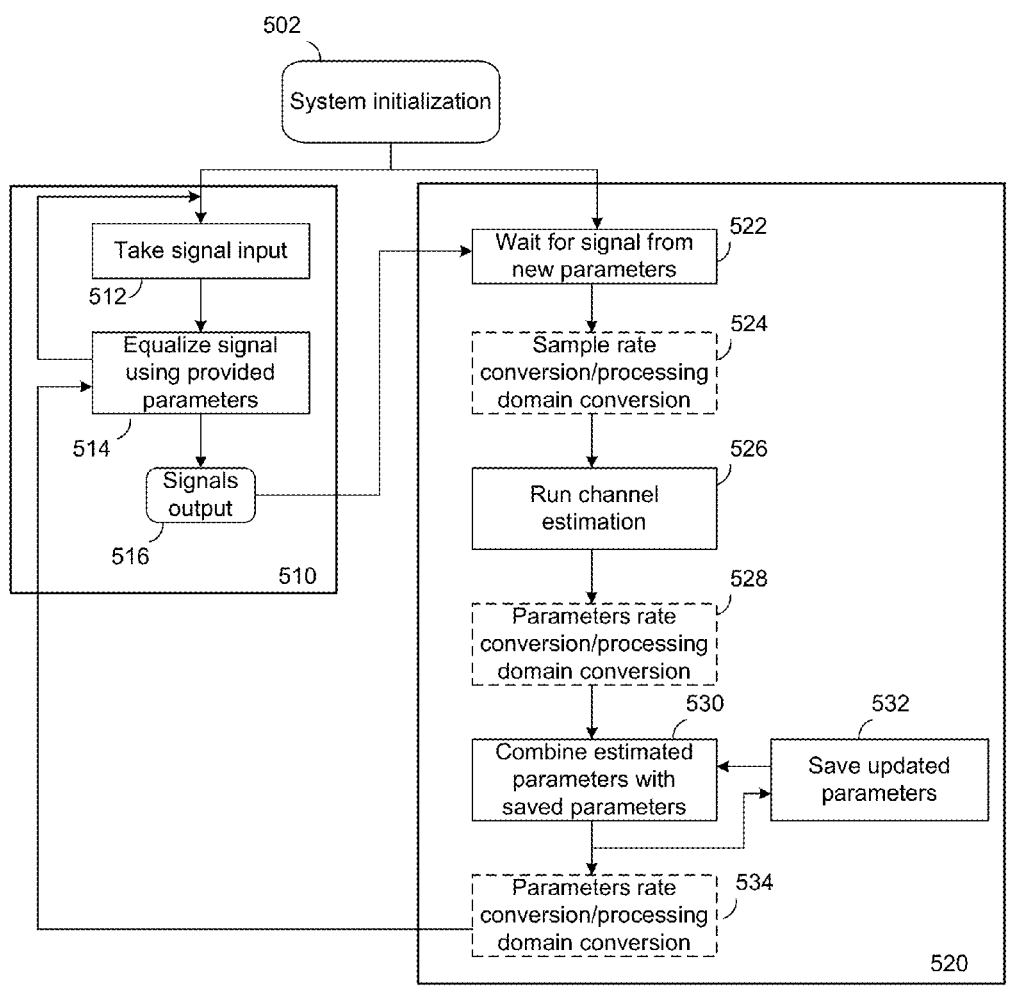
FIG. 5 shows an exemplary flow chart for performing digital receiver channel equalization.

FIG. 5 shows an exemplary flow chart for performing digital receiver channel equalization. The process includes signals equalization operations 510 and channel estimation operations 520. After system initialization, signals equalization 510 takes signal input (512) and equalizes the signal using provided parameters (514) where after system initialization, the parameters are initialized using provided pre-configured value; while during normal operation where inputs from channel estimation processing 520 are available, the process uses parameters from 520. This procedure is executed repeatedly.

In the channel estimation operation 520, the process first waits for available input (522) which is generated in 514. If necessary, rate conversion and/or processing domain conversion (frequency domain to time domain or vice versa) are also done (524). Then in 526 the process runs channel estimation for parameters update. In 528 the process applies rate conversion and/or processing domain conversion to the parameters output from 526 where necessary. The parameters are combined with saved parameter (530), which in one embodiment includes convolution and truncation. The outputs from 530 provide update to 514, and are also saved for next usage (532). Again rate conversion and/or domain conversion are applied to the parameters if necessary before feeding into 514 (534).

Figure 6:
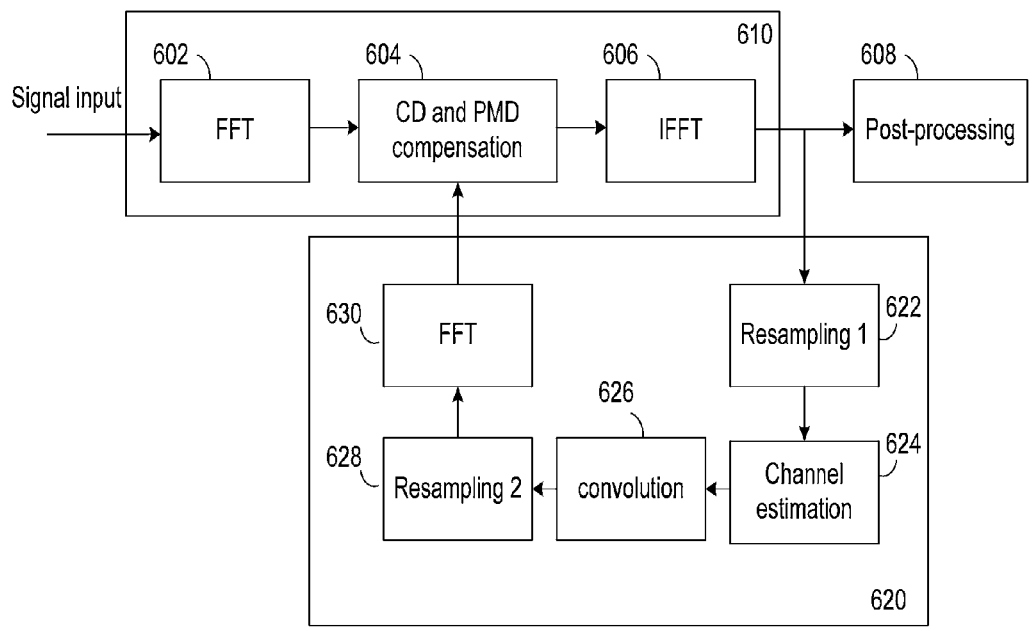
FIG. 6 shows an example application that includes frequency-domain CD and PMD compensation with time-domain coefficient update.

FIG. 6 shows an example application that includes frequency-domain CD and PMD compensation with time-domain coefficient update. In this example application, an optical digital receiver uses frequency domain equalization for both chromatic dispersion (CD) and polarization mode dispersion (PMD), together with time-domain channel estimation. Block 610 acts as frequency-domain equalization, which first converts input signal to frequency domain by FFT block 602, and then applies CD and PMD compensation coefficients to frequency signal in block 604. After that the signals are converted back to time domain by IFFT block 606. Outputs from 610 are provided to block 608 for further processing, such as signals rate conversion and phase/frequency offset compensation. Depending on the processing speed of channel estimation block 620, part of the output samples from block 610 are also provided to block 620 to estimate channel parameters which will provide update to CD and PMD compensation block 604. Assume signal input to block 610 has sampling rate different from that used in sub-level channel estimation block 624, then inside block 620, the output signals from block 610 are first resampled by resampler block 622 to match the rate in block 624. Sub-level channel estimation block 624 then applies estimation algorithm to track channel changes. The result from block 624 is fed into convolution block 626, which outputs the convolution of block 624's output and old result from block 626. The outputs from block 626 are updated parameters which will be converted by resampler block 628 to match the rate used in block 610. FFT block 630 follows block 628 to convert the updated parameters to frequency domain will is fed into CD and PMD compensation block 604.

By way of example, a digital receiver is discussed next. The digital receiver is essentially a computer with transceivers that can be wired or wireless. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

By treating the signal path from transmitter output all the way to dynamic equalizer's output as an extended channel, the system can apply channel estimation to this "extended channel" output, which is actually the equalized signal, and uses the estimated channel parameter to update the old one that result in the current output signals.

What is claimed is:

1. A method for dynamic channel estimation in a digital receiver, comprising:
    performing a dynamic equalization on an incoming signal to compensate for channel distortion;
    independently estimating one or more channel parameters for the dynamic equalization, wherein the one or more channel parameters track channel change, said parameter updating combining a pre-existing parameter with newly estimated channel parameters, said combining applying a convolution to the pre-existing and new parameters;
    determining a convolution of the channel parameters and updating the parameters for the dynamic equalization for subsequent processing of incoming signal;
    providing an equalized output from the digital receiver;
    keeping convolution outputs at a predetermined length using truncation; and
    dropping zero outputs in the truncation.

2. The method of claim 1, comprising converting the channel parameters to a rate or a format that matches the dynamic equalization rate or format.

3. The method of claim 1, comprising performing a sub-level channel estimation.

4. The method of claim 3, wherein the sub-level channel estimation comprises using an open loop with the incoming signal.

5. The method of claim 3, wherein the sub-level equalization uses the dynamic equalization.

6. The method of claim 1, wherein the dynamic equalization comprises blind equalization.

7. The method of claim 1, wherein the channel estimation uses a portion of output signals from the dynamic equalization.

8. The method of claim 1, wherein the performing dynamic equalization and the independently estimating one or more channel parameters are done using separate paths.

9. The method of claim 8, comprising applying rate conversion to the dynamic equalization prior to estimating the channels.

10. The method of claim 9, comprising applying the rate conversion to updated channel parameters prior to the dynamic equalization.

11. The method of claim 9, comprising applying the rate conversion to newly estimated parameters prior to combining with pre-existing parameters.

12. The method of claim 1, wherein the dynamic equalization is in a frequency domain and the estimating of channel parameters are in a time domain.

13. The method of claim 12, comprising converting newly estimated parameters to frequency domain prior to combining with pre-existing parameters.

14. The method of claim 13, comprising combining newly estimated parameters with pre-existing parameters by one-by-one multiplication.

15. The method of claim 12, comprising combining newly estimated parameters with pre-existing parameters and converting the combined parameters to a frequency domain.

16. The method of claim 1, wherein the dynamic equalization and the estimating of channel parameters are performed in a frequency domain.

* * * * *